(12) United States Patent
Jang et al.

(10) Patent No.: US 7,699,339 B2
(45) Date of Patent: Apr. 20, 2010

(54) BRACKET FOR SECURING SIDE AIRBAG FOR AUTOMOTIVE VEHICLE

(75) Inventors: Myung-ryun Jang, Suwon-si (KR); Byoung-sun Yoo, Seoul (KR); Tae-woo Kim, Wonju-si (KR); Dong-jun Lee, Wonju-si (KR); Eun-hwan Oh, Wonju-si (KR); Kyun-soon Choi, Jeonju-si (KR)

(73) Assignee: Delphi Korea Corporation, Troy, MI (US)

( * ) Notice: Subject to any disclaimer, the term of this patent is extended or adjusted under 35 U.S.C. 154(b) by 0 days.

(21) Appl. No.: 12/283,061

(22) Filed: Sep. 9, 2008

(65) Prior Publication Data

US 2009/0079173 A1 Mar. 26, 2009

Related U.S. Application Data

(62) Division of application No. 11/717,423, filed on Mar. 13, 2007.

(30) Foreign Application Priority Data

| Mar. 14, 2006 | (KR) | .................. 20-2006-0006828 U |
| Mar. 17, 2006 | (KR) | .................. 20-2006-0007230 U |
| Mar. 27, 2006 | (KR) | .................. 20-2006-0008135 U |
| Apr. 18, 2006 | (KR) | .................. 20-2006-0010369 U |
| Apr. 20, 2006 | (KR) | .................. 20-2006-0010629 U |

(51) Int. Cl.
*B60R 21/20* (2006.01)

(52) U.S. Cl. ................ 280/728.2; 280/730.2; 24/265 R
(58) Field of Classification Search .............. 280/728.2, 280/730.2; 24/289, 291, 292, 297, 295, 265 A, 24/265 AL, 265 R; 248/201, 500, 503, 505; 411/175
See application file for complete search history.

(56) References Cited

U.S. PATENT DOCUMENTS

| 1,549,142 | A | * | 8/1925 | McKenzie et al. | ............ 24/457 |
| 2,061,385 | A | * | 11/1936 | Nadler | ....................... 24/342.1 |
| 2,242,478 | A | * | 5/1941 | Pekarz | ........................ 24/457 |
| 5,987,714 | A | * | 11/1999 | Smith | ........................... 24/295 |
| 6,224,089 | B1 | * | 5/2001 | Uchiyama et al. | ......... 280/728.2 |
| 6,991,256 | B2 | * | 1/2006 | Henderson et al. | ....... 280/730.2 |
| 2002/0100146 | A1 | * | 8/2002 | Ko | ............................... 24/295 |
| 2005/0046154 | A1 | * | 3/2005 | Rhea et al. | ............... 280/728.2 |

FOREIGN PATENT DOCUMENTS

| JP | 2000079864 A | * | 3/2000 |
| JP | 2007083781 A | * | 4/2007 |

* cited by examiner

*Primary Examiner*—Paul N Dickson
*Assistant Examiner*—Drew Brown
(74) *Attorney, Agent, or Firm*—Thomas N. Twomey

(57) ABSTRACT

There is provided a bracket for securing a side airbag for an automotive vehicle. The bracket includes a support plate, an installation plate positioned at upper part of the support plate and including an installation aperture, and fixing plates formed by being forwardly bent from the right and left edges, with respect to the installation plate, of the support plate.

6 Claims, 16 Drawing Sheets

RELATED ART

RELATED ART

RELATED ART

BRACKET FOR SECURING SIDE AIRBAG FOR AUTOMOTIVE VEHICLE

CROSS-REFERENCE TO RELATED APPLICATION

This application is a divisional application of U.S. Ser. No. 11/717,423, filed on Mar. 13, 2007, for bracket for securing side airbag for automotive vehicle, which claims the benefit of Korean Utility Model Application No. 2006-0006828, filed on Mar. 14, 2006, No. 2006-0007230, filed on Mar. 17, 2006, No. 2006-0008135, filed on Mar. 27, 2006, No. 2006-010369, filed on Apr. 18, 2006, and No. 2006-010629, filed on Apr. 20, 2006, the disclosure of which is hereby incorporated herein by reference in its entirety.

BACKGROUND OF THE INVENTION

1. Technical Field

The present invention relates to a bracket for securing a side airbag for an automotive vehicle and, more particularly, to a bracket for securing a side airbag for an automotive vehicle, which easily secures the side airbag and is prevented from being broken or deformed when it is fastened by a bolt.

2. Discussion of Related Art

In addition to a safety belt, generally, an airbag module installed in an automotive vehicle is a device for maximally protecting an occupant against injury when the automotive vehicle crashes.

An airbag module is typically installed in or around a steering wheel of a driver seat and in an instrument panel of a passenger seat. When an automotive vehicle crashes, the airbag module is operatively connected to a safety belt by a crash sensing sensor and an electronic control unit (hereinafter, referred to as "ECU"), and it maximally protects an occupant against injury.

That is, when an automotive vehicle crashes, the crash sensing sensor outputs a crash sensing signal to the ECU. The ECU determines whether to operate an airbag, depending on the intensity of the crash. If the airbag needs to be operated, the ECU operates an inflator to inflate the airbag.

In recent years, an airbag module has been installed at a side in an automotive vehicle, to protect an occupant upon a side impact crash.

The airbag module installed at the side of an automotive vehicle is generally called a 'side airbag.'

The side airbag is installed in an A-pillar which is connected from the front passenger seat to the back seat. When side impact is applied, the side airbag is inflated by the operation of the inflator.

In this application, a side airbag is used for an automotive vehicle, which prevents excessive inflation pressure from being applied to a lower end part of the side airbag to be deployed when the vehicle encounters a side crash, and balances the inflation pressure by an injected gas in a thorax bag and a head bag to reduce shaking when the side airbag is inflated and improves the work efficiency upon manufacture.

The constitution of a side airbag will be described, in brief, with reference to FIG. 1A. The side airbag comprises: a thorax bag 12 and a head bag 11 to be deployed upon a side crash. The thorax bag 12 comprises a mounting part 14 and a lower end part 16. The mounting part 14 has a neck shape at a rear side of the thorax bag 12. The lower end part 16 is formed at a distance from the mounting part 14.

An upper part and a lower part of the side airbag are formed symmetrically, based on the center of the mounting part 14. A tether 13 is positioned between the thorax bag 12 and the head bag 11. A vent aperture is formed in the side airbag at a distance from the mounting part 14. A pulling plate 15 is symmetrical with the thorax bag 12, and the thorax bag 12 is extended from the head bag 11.

The aforementioned side airbag is installed by fastening a bolt to the A-pillar of the automotive vehicle. To install the side airbag onto the A-pillar, additional securing devices are needed.

That is, a number of brackets, each having a securing aperture into which a bolt is inserted, are positioned at predetermined positions of the side airbag and are secured by fastening bolts.

An example of a conventional securing device of the aforementioned side airbag will be described with reference to FIG. 1B. A bracket 3a with a welding bolt 2a is welded at one side of a back part frame 1a. A back part 7a with a pad 5a covered by a cover 6a is positioned at one side of an installation space 4a of the side airbag.

The end of the cover 6a is inserted into the airbag installation space 4a. Therefore, one side of each of the airbag housing 8a and the airbag door 9a is positioned inside a support wire 10a, and the other side of each of the airbag housing 8a and the airbag door 9a is fixed to the welding bolt 2a of the bracket 3a.

However, since the conventional bracket for securing the side airbag is usually made of plastics, the bracket is broken or deformed while the bolt is fastened and therefore, the bracket cannot perform its function. Moreover, since this problem makes it impossible for the side airbag to be normally operated, an occupant is fatally injured.

Another conventional side airbag 30 comprises: an airbag which is installed inside a headlining of a roof side panel; an inflator which is installed at one side of the airbag and which has a gas generating material to deploy the airbag upon a side crash; and a guide member with one side end which is connected to the airbag and the other side end which is positioned to pivot around the roof side panel.

The constitution of the aforementioned side airbag 30 will be described, in detail, with reference to FIGS. 2A and 2B.

As described in FIG. 2, a headlining 21 is composed of plastics which are attached to the ceiling inside an automotive vehicle. Basic materials of the headlining 21 are the surface and pad with the functions, such as insulation from the roof, insulation of sound, or absorption of sound inside the vehicle and the like. The headlining 21 is formed integrally with these surface and pad.

As a device to perform an operation of deploying the side airbag 30, an inflator 40 rapidly burns a gas generating material including an element of sodium nitrite, and the like, by using an igniter and simultaneously generates nitrogen gas. The inflator 40 is secured to a roof side panel 25 by a separate bracket 41.

A strap 31 (hereinafter, referred to as "connection strap") is positioned at the other side of the inflator 40. The strap 31 prevents one side of the side airbag 30 from waving when the airbag 30 is deployed by the inflator. This is illustrated in FIG. 2B.

However, since the conventional side airbag has no specific structure to hold the connection strap, it is troublesome to assemble the side airbag in the A-pillar due to the interference between the A-pillar and the connection strap.

That is, an operator in a manufacturing site needs to check whether there is the interference with the connection strap when assembling the side airbag in the A-pillar. When the interference occurs, a process of avoiding the interference is added. As a result, a working time becomes longer and the assembling efficiency is deteriorated.

Further, as illustrated in FIG. 3A, a conventional bracket 50 for securing a side airbag has a shape in which a connection strap 52 is connected to a simply long rectangular aperture 51. Therefore, the bracket 50 is not properly connected to the connection strap 52.

That is, since the connection strap 52 is movable in the bracket 50, the connection strap 52 turns within the rectangular aperture 51 of the bracket 50, as illustrated in FIG. 3B.

Therefore, when the side airbag is mounted in an automotive vehicle, there are added a process of checking whether a state of the bracket is good or bad and, if the connection strap 52 turns, a process of returning the connection strap 52 to its original position. Consequently, the work becomes troublesome.

Moreover, the bracket 50 is pulled towards the side airbag due to momentary gas explosive power which is generated while the side airbag is operated upon an accident. In this case, the connection strap 52 inclines towards a lower part of the rectangular aperture 51 as illustrated in FIG. 3C. Consequently, the side airbag is not stably secured.

Moreover, when a connection strap 52 is cut by the friction caused during the accident, the side airbag is not inflated in a normal direction, upon the side crash.

Another conventional side airbag 60 will be described with reference to FIGS. 4A and 4B.

As illustrated in FIGS. 4A and 4B, the side airbag 60 comprises: a side airbag cushion 61, an inflator 62 supplying a gas to the side airbag cushion 61, a housing receiving the inflator 62, and a diffuser 64 included in the side airbag 60 and supplying a gas, which is generated from the inflator 62, to the side airbag cushion 61.

The inflator 62 is electrically connected to a control unit (not shown). The control unit is connected to a crash sensing sensor (not shown) in an automotive vehicle.

The side airbag cushion 61 is formed, at predetermined width and length, to sufficiently protect a head part of an occupant of the automotive vehicle. A tether 65 is provided in one part of an end of the side airbag cushion 61. The tether 65 guides the side airbag 60 to be broadly inflated lengthwise or widthwise when the side airbag 60 is deployed.

The diffuser 64 has a tube shape. A number of apertures (not shown) are formed, to be positioned lengthwise, on an outer circumference surface of the diffuser 64. While the diffuser 64 is received inside an upper end part of the side airbag 60, one end of the diffuser 64 is connected to the housing 63 receiving the inflator 62.

When the diffuser 64 and the housing 63 are connected to each other, a holder 66 fastens a part of the side airbag 60 which covers the connection part of the diffuser 64 and the housing 63, to be sealed.

A number of holders 67 are connected to the upper end of the side airbag 60, at a predetermined interval. The holders 67 secure the side airbag cushion 61 to a roof rail. The holders 67 cover an external surface of a side airbag housing 68 and temporarily hold the side airbag housing 68. The side airbag housing 68 covers the side airbag cushion 61 which is folded.

However, in the conventional side airbag 60, the holders 67 securing the side airbag 60 are formed of a single material. When the holders 67 are made of a soft material, an additional component is needed to prevent the holders 67 from being broken when the side airbag 60 is secured to the automotive vehicle by fastening a bolt. When the holders are made of a hard material to prevent the holders from being broken, there is a difficulty in cutting a cutting part when the side airbag 60 is deployed.

Further, in the aforementioned conventional side airbag 60, a space of each holder 67 is narrow and a shape of the holder 67 is gradually narrower downwardly. Therefore, since a region for supporting the side airbag 60 is narrow, many holders 67 are needed. This results in a longer working time in the manufacturing site.

That is, when the conventional side airbag 60 is mounted, since the additional components are needed and a number of holders 67 are installed, the assembling efficiency is lowered and the operability is not consistently provided by the defect of assembly.

SUMMARY OF THE INVENTION

The present invention is directed to provide a bracket for securing a side airbag for an automotive vehicle, wherein assembling the side airbag in a manufacturing site is easy, by fixing a path of a connection strap so that the connection strap connecting the side airbag to the bracket is secured against an A-pillar and by removing interference with the connection strap upon the assembling of the side airbag.

Another aspect of the present invention is to provide a bracket for securing a side airbag for an automotive vehicle, wherein a connection strap is prevented from affecting a deploying performance of the side airbag, by making it easy for the connection strap to be released from a clip.

Exemplary embodiments of the present invention provide brackets for securing a side airbag for an automotive vehicle.

In accordance with an exemplary embodiment, a bracket for securing a side airbag for an automotive vehicle, comprises: a bracket for fixing a connection strap which is configured to connect the side airbag to the vehicle, and wherein the bracket comprises: a support plate; an installation plate positioned at a middle upper part of the support plate and including an installation aperture; and a fixing part formed by being bent from the right and left edges towards the interior of the automotive vehicle, with respect to the installation plate, of the support plate.

The fixing plates may be bent from an upper end edge of the support plate.

One of the fixing plates may be bent from an upper end edge of the support plate, and the other one may be bent from a lower end edge of the support plate.

Fixing protrusions and fixing apertures may be complementarily formed on the support plate and the fixing plates, to be positioned to correspond to each other.

The fixing plate may be provided with fixing protrusion in a square shape with the other three sides are cut except for the lower end, to be bent towards the supporting plate.

The end of the fixing plate may be bent towards the supporting plate.

A hook which is bent towards the automotive vehicle may be formed on an upper end of the installation plate.

BRIEF DESCRIPTION OF THE DRAWINGS

The above and other features and advantages of the present invention will become more apparent to those of ordinary skill in the art by describing in detail preferred embodiments thereof with reference to the attached drawings in which.

DETAILED DESCRIPTION OF THE INVENTION

Figure 1A:
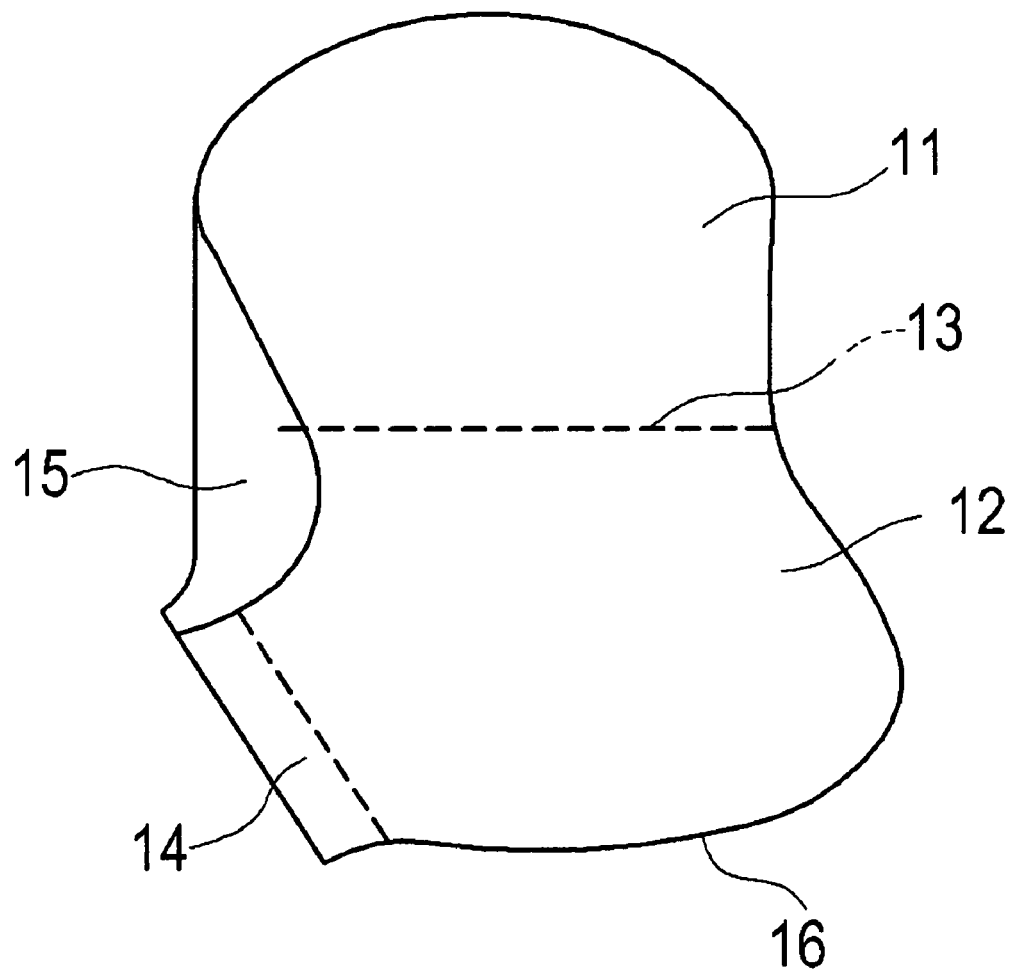
FIG. 1A shows an example of a conventional side airbag.
Figure 1B:
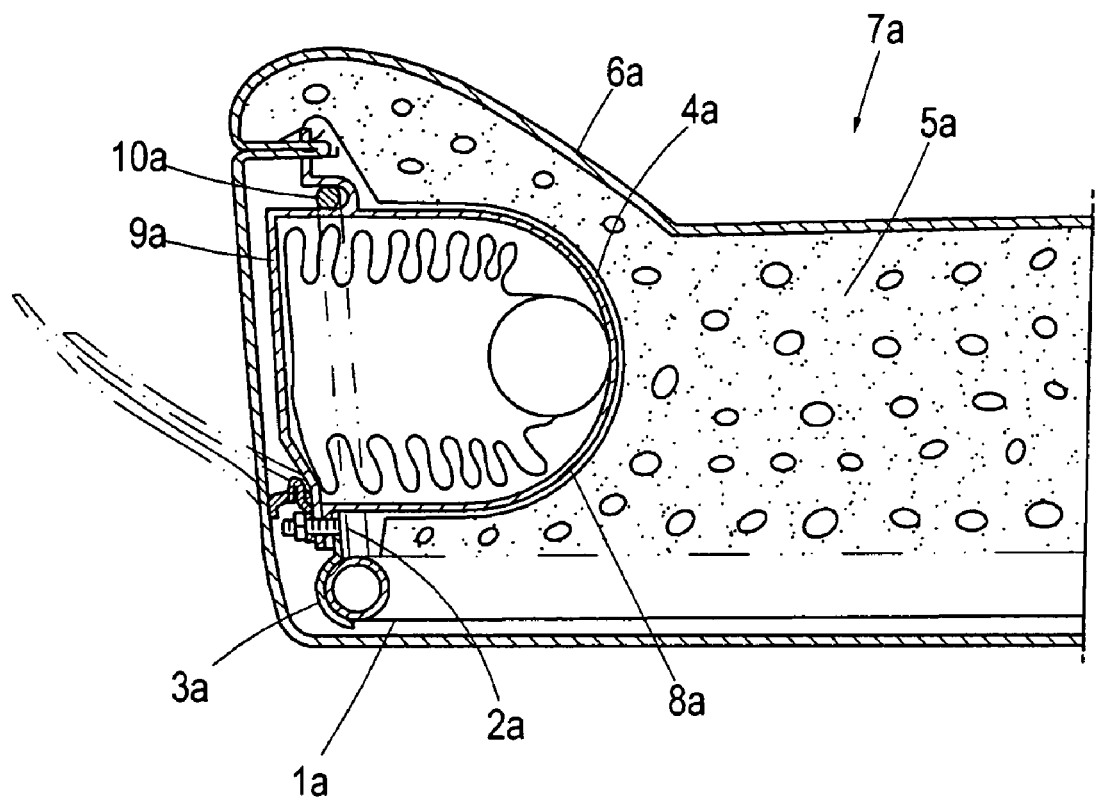
FIG. 1B shows an example of a conventional bracket for securing a side airbag.
Figure 2A:
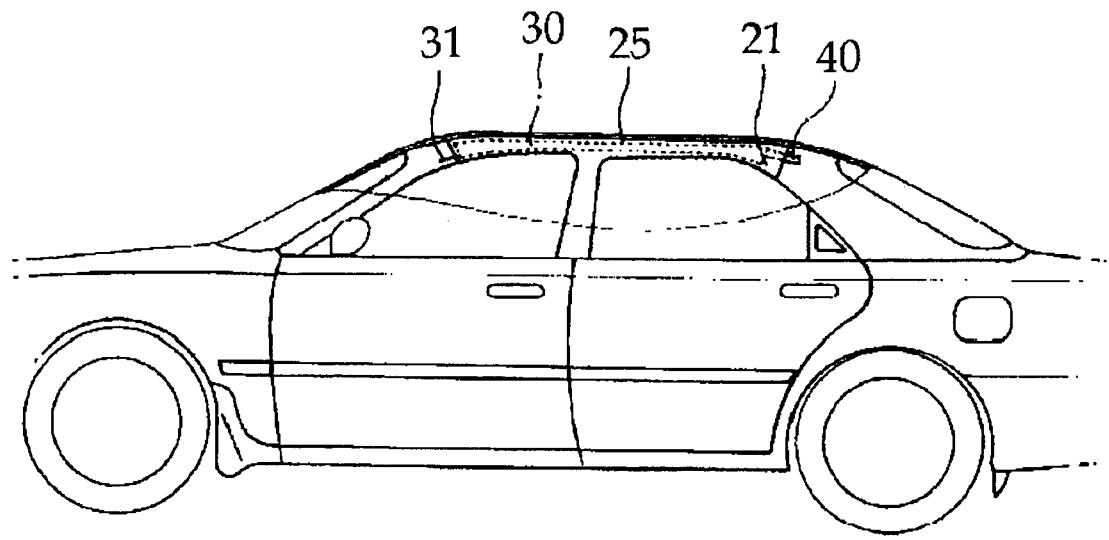
FIGS. 2A and 2B show an example of another conventional side airbag.
Figure 2B:
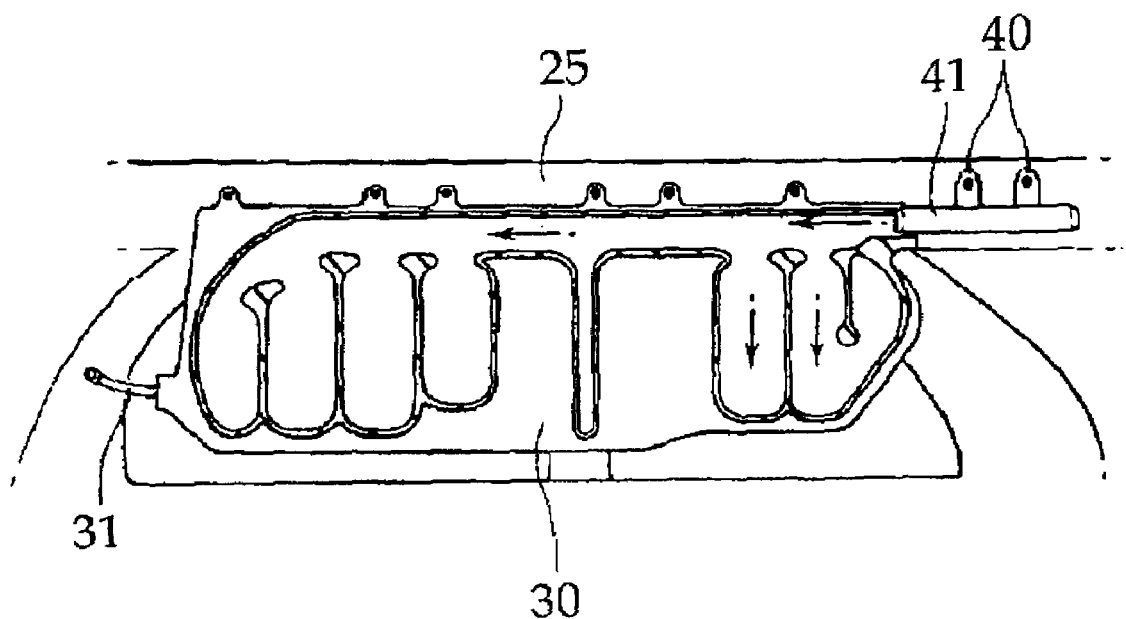
Figure 3A:
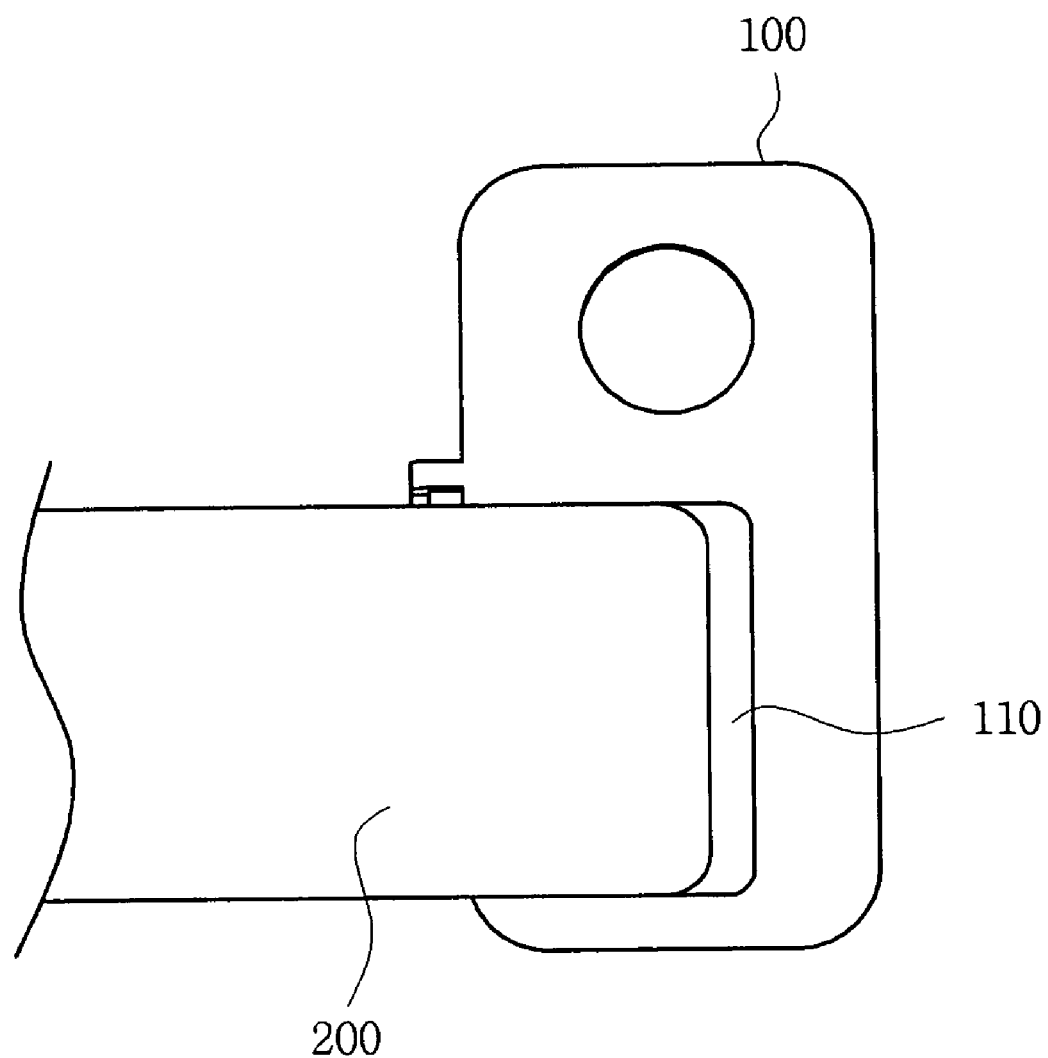
FIGS. 3A, 3B and 3C are front views of another conventional securing bracket.
Figure 3B:
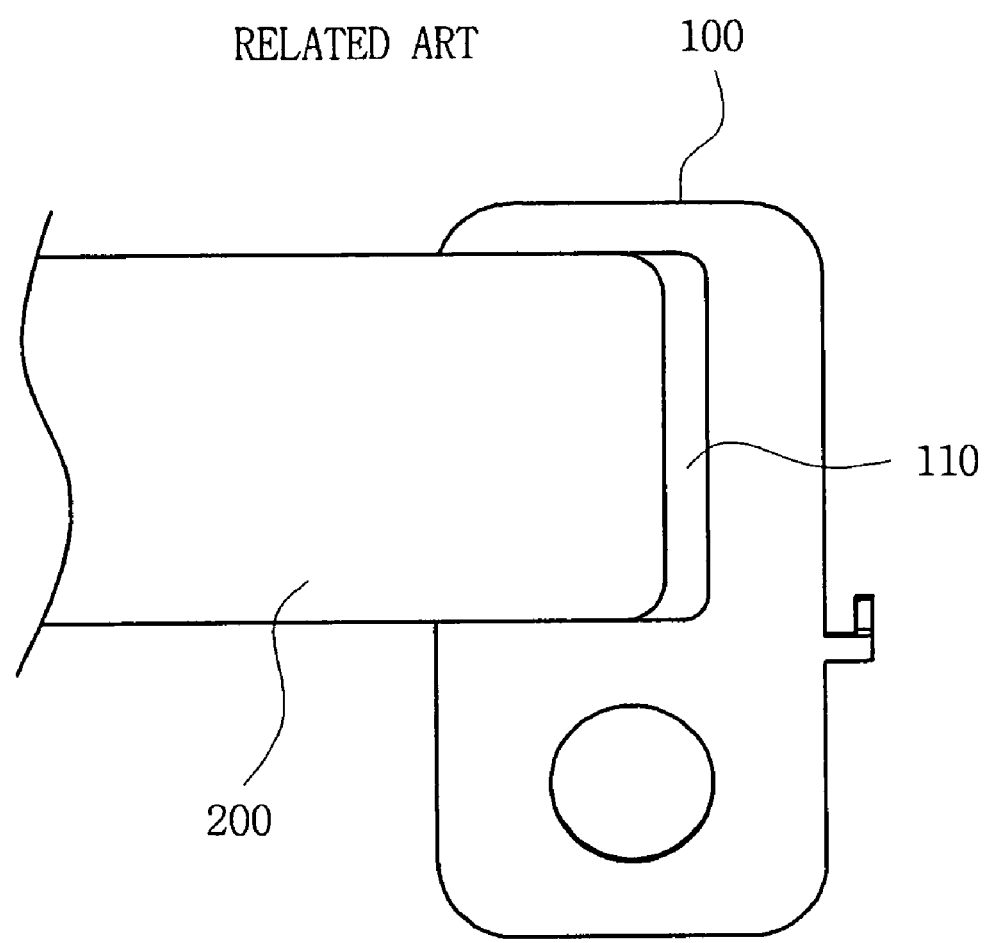
Figure 3C:
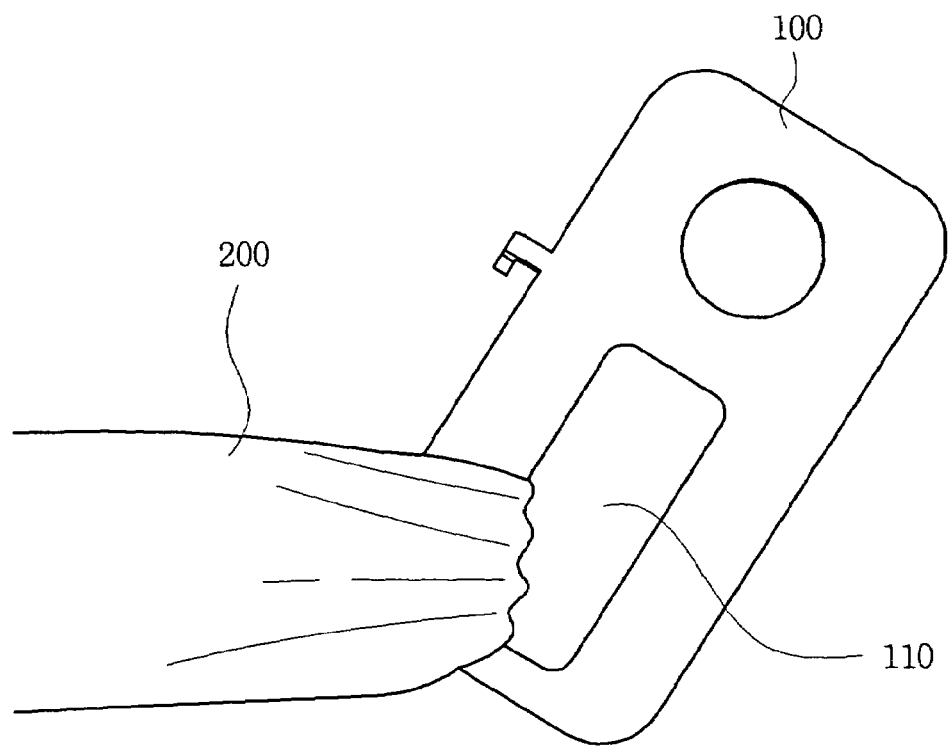
Figure 4A:
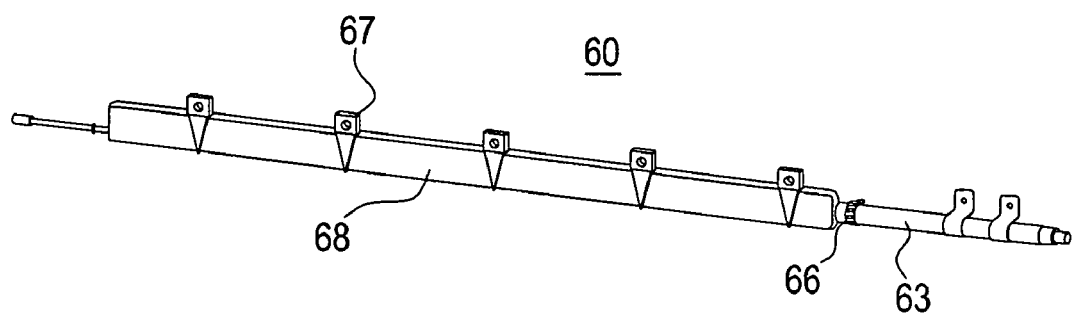
FIGS. 4A and 4B respectively show another conventional side airbag which is assembled and dissembled.
Figure 4B:
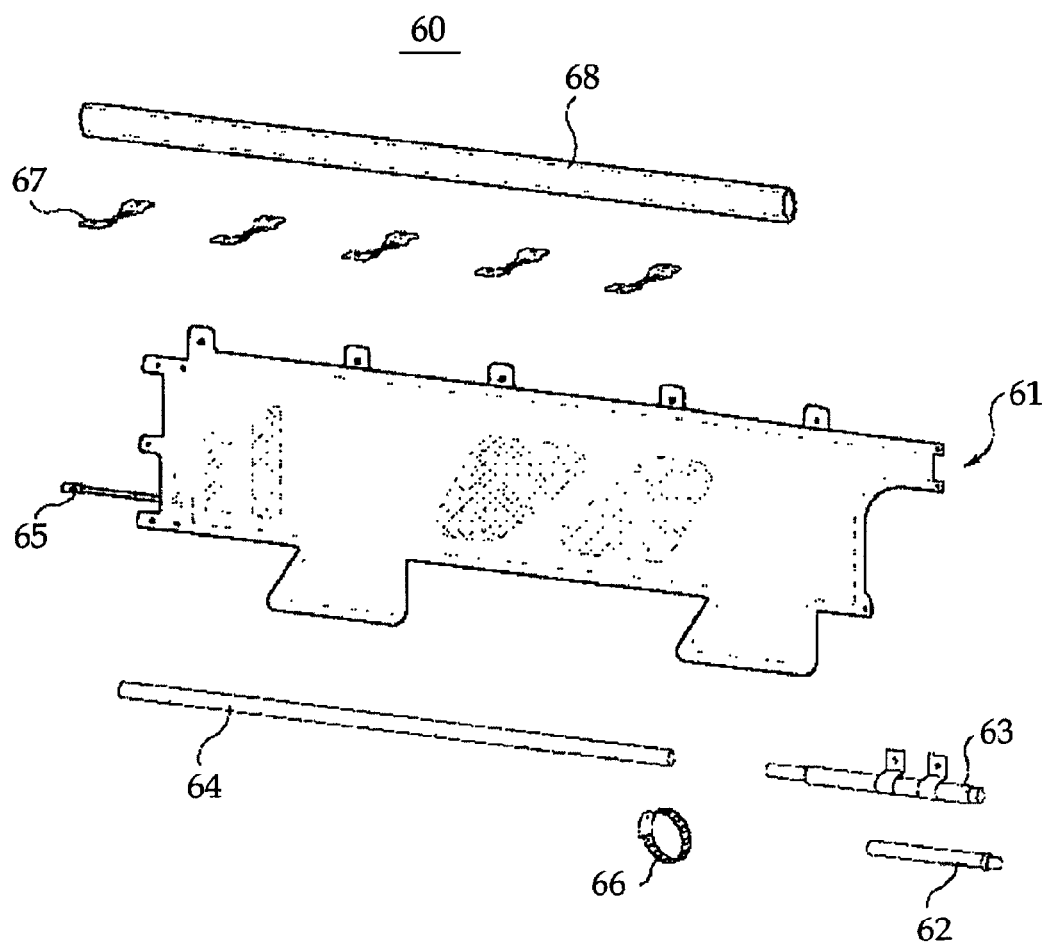

The present invention will now be described more fully hereinafter with reference to the accompanying drawings, in which preferred embodiments of the invention are shown. This invention may, however, be embodied in different forms and should not be construed as limited to the embodiments set forth herein.

First Exemplary Embodiment

A bracket 200 for securing a side airbag for an automotive vehicle according to a first exemplary embodiment will be described, in detail, with reference to the accompanying drawings.

The same reference numeral refers to the same element, and no further description of the same element will be presented.

Figure 5:
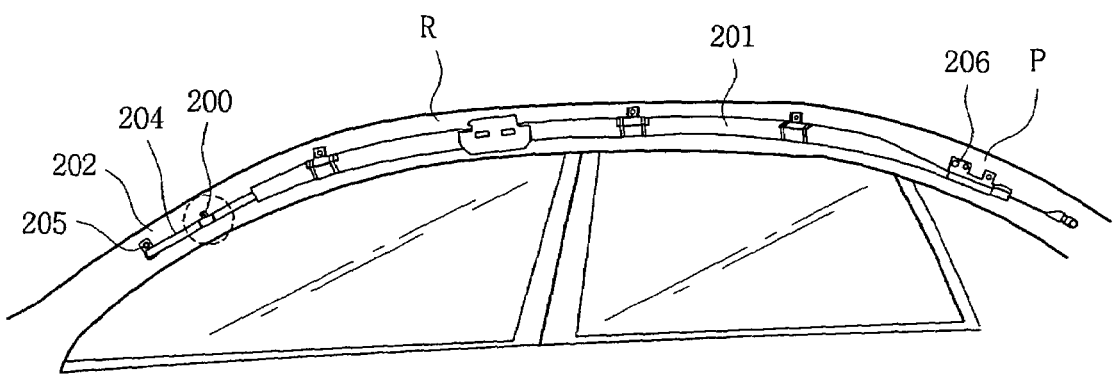
FIG. 5 is a front view of an installation position of a bracket for securing a side airbag for an automotive vehicle according to a first exemplary embodiment of the present invention.
Figure 6:
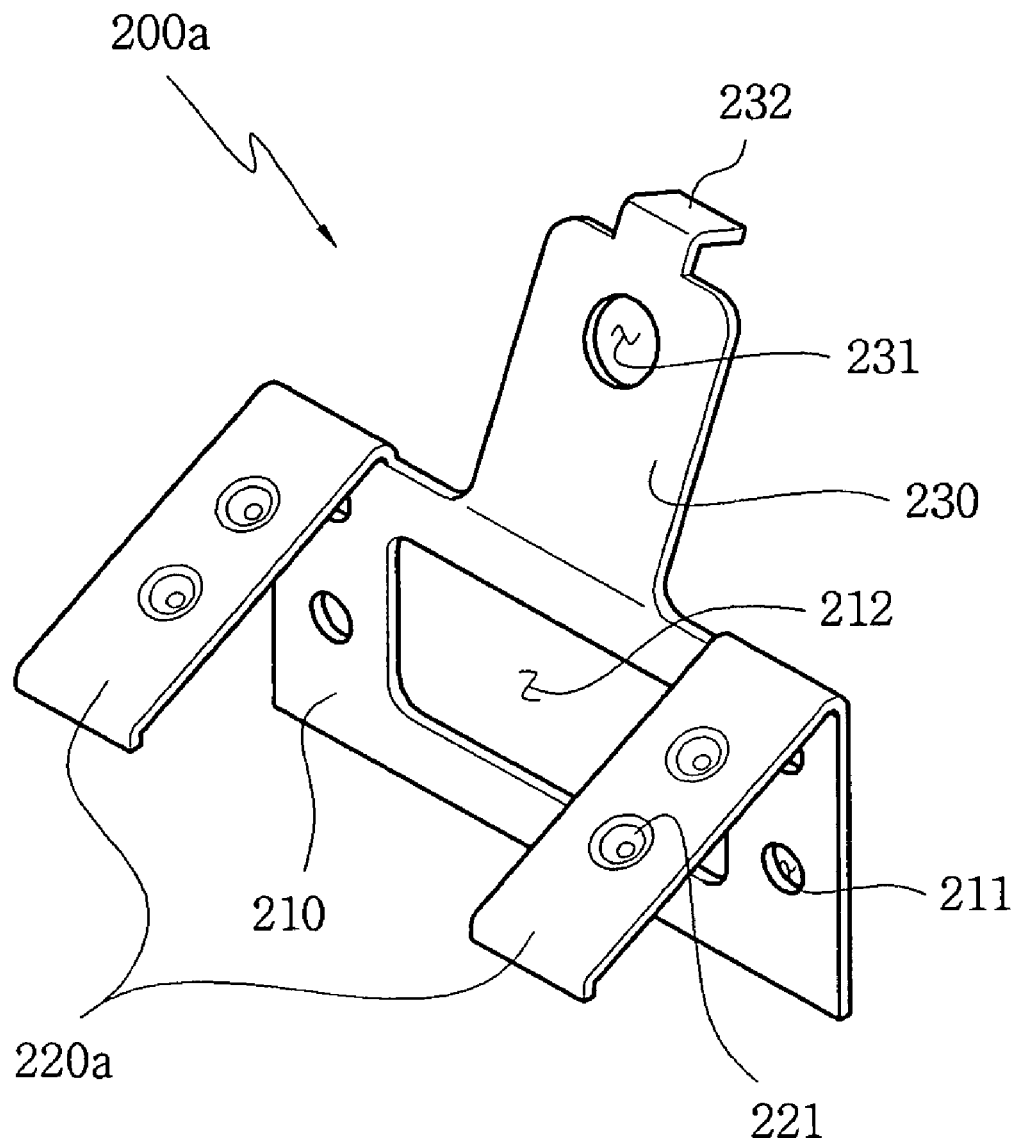
FIG. 6 is a perspective view of a shape of the bracket according to the first exemplary embodiment.

FIG. 5 is a front view of an installation position of the bracket 200 for securing a side airbag for an automotive vehicle according to the first exemplary embodiment of the present invention.

As illustrated in FIG. 5, a side airbag 201 is mounted inside a roof side panel R of the vehicle. One end of the side airbag 201 is secured to a buckle 205 in an A-pillar 202, and the other end thereof is connected to a C-pillar P through an inflator 206.

The side airbag 201 and the buckle 205 are connected to each other by a connection strap 204. The bracket 200 fixing a path of the connection strap 204 is positioned in the middle part of the connection strap 204.

The side airbag 201 includes a sensor (not shown) for sensing a crash of the vehicle and an electronic control unit for operating the inflator 206 by receiving a signal from the sensor.

That is, the buckle 205 is fixed to the A-pillar 202 at the front part of the side airbag 201. The buckle 205 is connected to the side airbag 201 by the connection strap 204. The connection strap 204 is fixed by the bracket 200.

The inflator 206 including a gas for deploying the side airbag 201 is installed in the rear part of the side airbag.

FIGS. 6 through 8B are perspective views of a shape of the bracket 200a according to the first embodiment.

As illustrated, a bracket 200a comprises a support plate 210 and an installation plate 230. The installation plate 230 is formed by being bent from the support plate 210.

An installation aperture 231 is formed in the installation plate 230. When the side airbag 201 is installed in the vehicle, a bolt is fastened through the installation aperture 231. A hook 232 is formed on an upper end of the installation plate 230. The hook 232 makes it easy to be secured when the side airbag 201 is installed in the vehicle.

The support plate 210 is a part of directly fixing the connection strap 204. Fixing plates 220 are respectively formed to be bent at an upper end of both sides of the support plate 210.

Therefore, after the side airbag 201 is mounted in the vehicle, the fixing plates 220a are pressed so that the connection strap 204 is positioned between the fixing plates 220a and the support plate 210. Accordingly, the fixing plates 220a, the connection strap 204 and the support plate 210 are secured to one another.

Two pairs of fixing protrusions 221 formed on the fixing plates 220a enable the connection strap 204 to be more stably fixed.

Further, a slimming aperture 212 in a rectangular form is made in the middle of the support plate 210, for cost reduction and weight reduction. Two pairs of apertures 211 are formed on both sides of the slimming aperture 212. The apertures 211 are positioned so as to correspond to the fixing protrusions 221 of the fixing plates 210, so that the fixing protrusions 221 are respectively inserted into the apertures 211.

Figure 7:
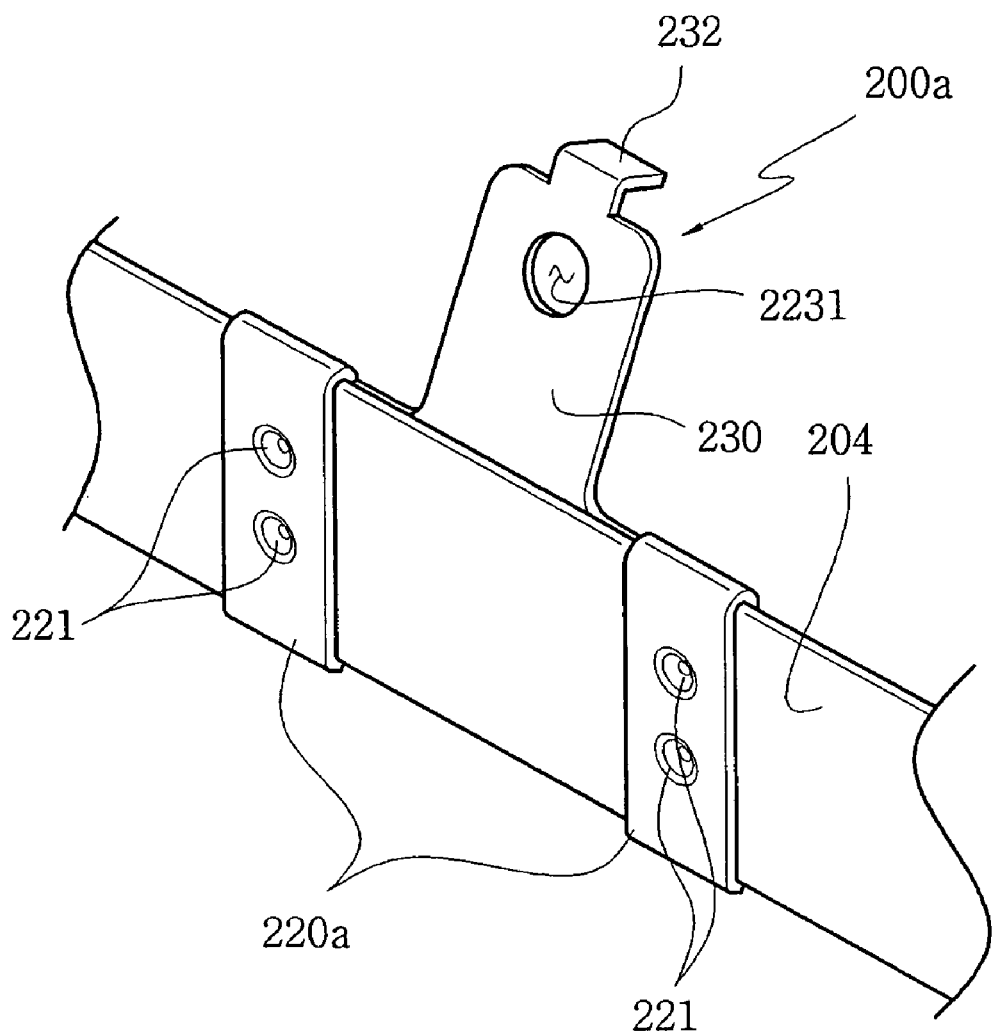
FIG. 7 is a perspective view of the constitution connecting the bracket of FIG. 6 to a connection strap.

FIG. 7 is a perspective view of a shape of the bracket 200a and the connection strap 204 according to the first exemplary embodiment.

As illustrated in FIG. 7, the fixing plates 220a of the bracket 200a are pressed to be fixed when the fixing plates 220a are assembled with the connection strap 204. Further, the fixing protrusions 221 to be inserted into the apertures 211 of the support plate 210 press the connection strap 204 to be fixed, without interference. Therefore, the security between the connection strap 204 and the fixing plates 220a is increased.

Figure 8A:
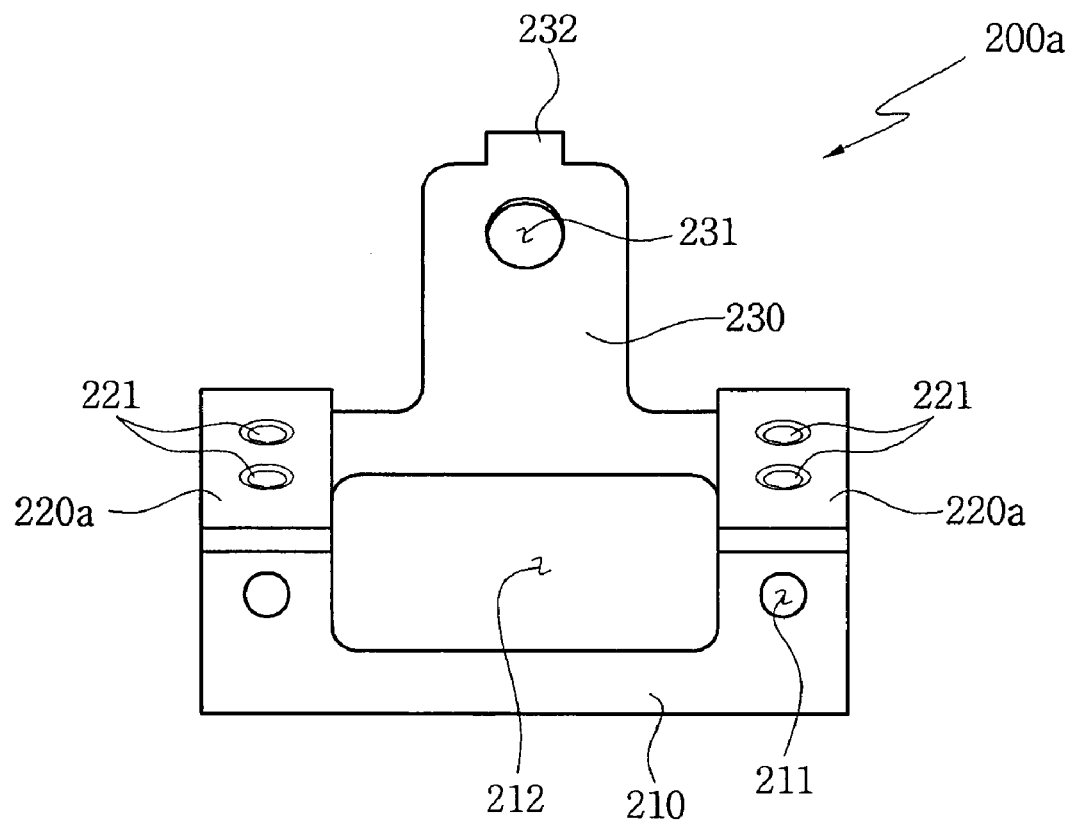
FIGS. 8A and 8B are respectively a front view and a side view of the bracket of FIG. 6.
Figure 8B:
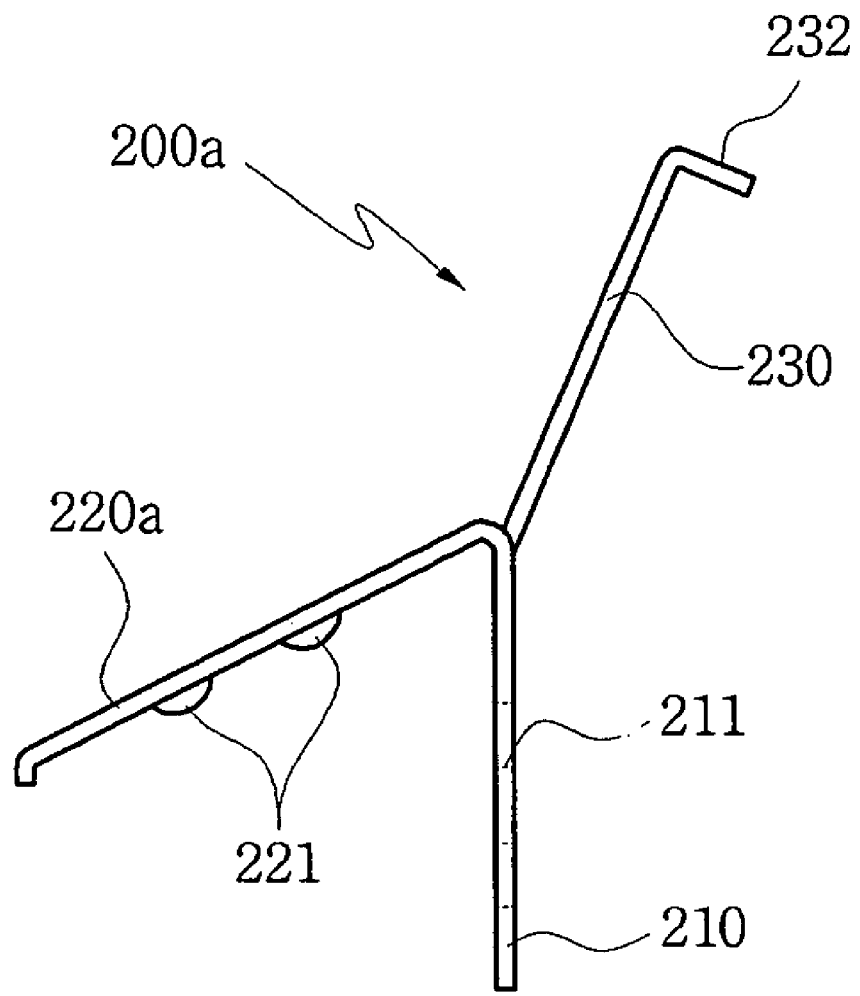

FIG. 8A is a front view of the bracket 200a and FIG. 8B is a side view of the bracket 200a according to the first exemplary embodiment.

As illustrated in FIGS. 8A and 8B, since the fixing plates 220a are bent to form an obtuse angle between the installation plate 230 and the support plate 210, a bolt is easily fastened and the bracket 200a is secured to a body of the vehicle.

Further, the fixing plates 220a are bent towards the support plate 210 so that the pressing process is easy upon the assembling. The ends of the fixing plates 220a are slightly bent to hold the connection strap 204 downwardly when the fixing plates 220a are pressed to fix the connection strap 204. The slightly bending ends of the fixing plates 220a are one-touch connected to the downward edge of the support plate 210, thereby preventing the connection strap 204 from slipping out from the bracket 200a.

Further, the description of the same constitution of second and third exemplary embodiments of the present invention as that of the first exemplary embodiments described above will not be further presented. The different constitution of the second and third exemplary embodiments from the first exemplary embodiment will be described in brief.

Second Exemplary Embodiment

Figure 9:
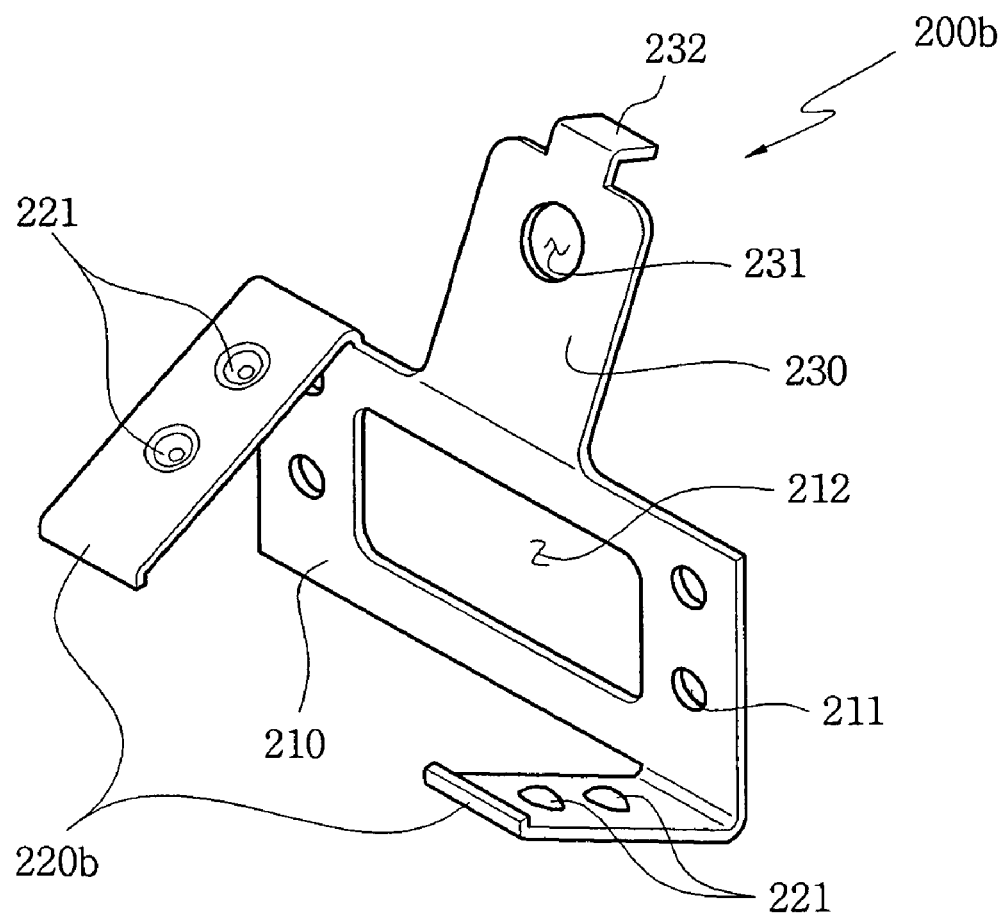
FIG. 9 is a perspective view of a bracket for securing a side airbag for an automotive vehicle according to a second exemplary embodiment of the present invention.

FIG. 9 is a perspective view of a bracket 200b for securing a side airbag for an automotive vehicle according to the second exemplary embodiment.

As illustrated in FIG. 9, one of fixing plates 220b in the bracket 200b is bent from an upper end edge of a support plate 210 and the other is bent from a lower end edge of the support plate 210, so that a connection strap 204 is prevented from slipping down.

Third Exemplary Embodiment

Figure 10:
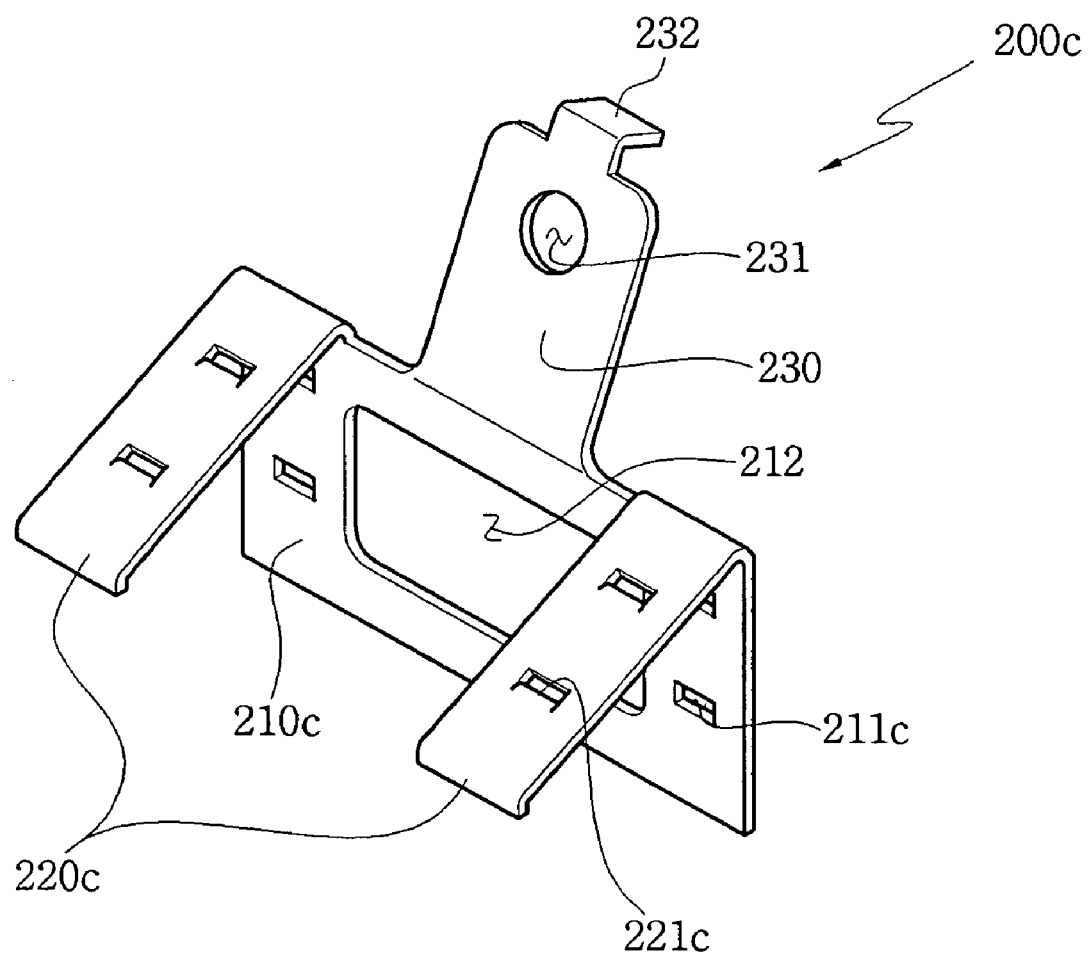
FIG. 10 is a perspective view of a bracket for securing a side airbag for an automotive vehicle according to a third exemplary embodiment of the present invention.

FIG. 10 is a perspective view of a bracket 200c for securing a side airbag for an automotive vehicle according to the third exemplary embodiment.

As illustrated in FIG. 10, fixing protrusions 221c of fixing plates 220c in the bracket 200c respectively have a square form. Specifically, the fixing plates 220c are cut in the other three sides, except for a lower end, at predetermined positions. The cut three sides in each position are bent to protrude towards the support plate 210c, thereby preventing a connection strap 204 from slipping out. And holes 211c are formed to connect the fixing protrusions 221c in the support plate 210c.

In accordance with the above-described present invention, the connection strap 204 which is formed to be extended to a side airbag 201 is fixed by the bracket 200 (200a, 200b, 200c) and the path of the connection strap 204 is fixed. Therefore, there is no interference between the connection strap 204 and the A-pillar when the side airbag 201 is assembled. Consequently, the efficiency of assembling in a manufacturing site is improved. Furthermore, since the connection strap 204 is easily lift when the side airbag 201 is deployed, it does not affect the deploying performance.

In the bracket for securing a side airbag for an automotive vehicle according to the exemplary embodiment of the present invention, the path of the connection strap connecting the side airbag to the bracket is fixed by the bracket and there is no interference by the connection strap when the bracket is assembled to install the side airbag in the A-pillar, thereby improving the assembling efficiency in the manufacturing site, to save time and improve productivity.

In the bracket for securing a side airbag for an automotive vehicle according to the exemplary embodiments of the present invention, since the connection strap is allowed to be easily released when the side airbag is deployed, it does not affect the deploying performance.

What is claimed is:

1. A bracket for securing a side airbag for an automotive vehicle, comprising:
   a bracket for fixing a connection strap which is configured to connect the side airbag to a pillar of the vehicle, and wherein the bracket comprises:
   a support plate comprising a right edge portion and a left edge portion;
   an installation plate extending from an upper part of the support plate intermediate the right edge portion and the left edge portion, said installation plate including an installation aperture;
   fixing plates disposed at the right edge portion and the left edge portion, said fixing plates being integrally formed with said support plate and being bent to overlie the support plate with the connection strap therebetween; and
   fixing protrusions located on one of said support plate and said fixing plate, and fixing apertures located on an other of said support plate and said fixing plate, such that the fixing protrusions are adapted to be received in the fixing apertures with said connection strap therebetween.

2. The bracket according to claim 1, wherein the fixing plates are bent from an upper end edge of the support plate.

3. The bracket according to claim 1, wherein one of the fixing plates is bent from an upper end edge of the support plate, and the other one is bent from a lower end edge of the support plate.

4. The bracket according to claim 1, wherein the fixing plate includes a fixing protrusion having a square shape that includes three cut sides and a lower end that is bent so that the protrusion protrudes toward the supporting plate.

5. The bracket according to claim 1, wherein each fixing plate includes an end, and wherein the end of the fixing plate is bent towards the supporting plate.

6. The bracket according to claim 1, wherein a hook which is bent towards the automotive vehicle is formed on an upper end of the installation plate.

* * * * *